(12) United States Patent
Keohane et al.

(10) Patent No.: US 8,005,903 B2
(45) Date of Patent: Aug. 23, 2011

(54) METHOD AND APPARATUS FOR MANAGING LOCALLY STORED E-MAIL MESSAGES

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 11/609,963

(22) Filed: Dec. 13, 2006

(65) Prior Publication Data

US 2008/0147800 A1 Jun. 19, 2008

(51) Int. Cl.
*G06F 15/16* (2006.01)
*H04L 12/58* (2006.01)
*H04M 11/00* (2006.01)

(52) U.S. Cl. ............... 709/206; 455/412.1; 379/100.06

(58) Field of Classification Search .......... 709/217–229, 709/201–206; 62/180; 711/159; 455/412.1; 379/100.06
See application file for complete search history.

(56) References Cited

U.S. PATENT DOCUMENTS

| | | | |
|---|---|---|---|
| 4,467,617 A * | 8/1984 | Morgan et al. ............... | 62/180 |
| 5,937,050 A * | 8/1999 | Yue et al. ................ | 379/100.06 |
| 6,477,543 B1 | 11/2002 | Huang et al. | |
| 7,464,139 B2 * | 12/2008 | Malik ........................... | 709/206 |
| 2001/0042099 A1 * | 11/2001 | Peng ............................. | 709/206 |
| 2004/0221048 A1 * | 11/2004 | Ogier ............................ | 709/229 |
| 2005/0015450 A1 | 1/2005 | Keohane et al. | |
| 2005/0021636 A1 * | 1/2005 | Kumar ......................... | 709/206 |
| 2005/0038862 A1 | 2/2005 | Keohane et al. | |
| 2005/0055413 A1 | 3/2005 | Keohane et al. | |
| 2005/0066009 A1 | 3/2005 | Keohane et al. | |
| 2005/0138305 A1 * | 6/2005 | Zellner ......................... | 711/159 |
| 2006/0031305 A1 | 2/2006 | Keohane et al. | |
| 2006/0031329 A1 * | 2/2006 | Robertson ..................... | 709/206 |
| 2007/0010232 A1 * | 1/2007 | Klassen ..................... | 455/412.1 |
| 2007/0088786 A1 * | 4/2007 | Hardy et al. .................. | 709/206 |

OTHER PUBLICATIONS

Keohane et al., "Method for automatic alternative delivery of data or messages to secondary targets if primary fails", Research Disclosure Bulletin, No. 455, Article 163, Mar. 2002, pp. 519.

* cited by examiner

*Primary Examiner* — Ian N Moore
*Assistant Examiner* — Kiet Tang
(74) *Attorney, Agent, or Firm* — Yee & Associates, P.C.; Justin M. Dillon

(57) ABSTRACT

A computer implemented method, apparatus, and computer usable program code for managing e-mail messages. A local copy of the e-mail message is stored on the data processing system for a selected period of time in response to sending an e-mail message to a recipient from a data processing system. A determination is made as to whether the local copy of the e-mail message is present in response to receiving a notification that the recipient is unable to respond. The local copy of the e-mail message is retrieved if the local copy of the e-mail message is present to form a retrieved e-mail message. The retrieved e-mail message is presented.

14 Claims, 3 Drawing Sheets

METHOD AND APPARATUS FOR MANAGING LOCALLY STORED E-MAIL MESSAGES

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for automatically retrieving e-mail messages.

2. Description of the Related Art

The Internet is a global network of computers and networks joined together by gateways that handle data transfer and the conversion of messages from a protocol of a sending network to a protocol used by a receiving network. On the Internet, any computer may communicate with any other computer. Information between computers travels over the Internet through a variety of languages also referred to as protocols. One set of protocols used on the Internet is called the Transmission Control Protocol/Internet Protocol (TCP/IP).

The Internet has revolutionized communications and commerce as well as being a source of information and entertainment. For many users, e-mail is a widely used format to communicate over the Internet. It is commonplace for users to send e-mail messages to others users through the Internet.

The use of e-mail messages is commonplace for personal and business use. E-mail messages are used by individuals to keep in touch with and communicate with other users. Additionally, e-mail messages provide a medium to collaborate and exchange documents.

Mail servers often limit the amount of storage space for e-mail messages. Further, users may have a limited amount of local storage. As a result, some users choose not to save copies of sent e-mail messages. While this process allows the user to save on storage space, unnecessary repetitive work may occur in some cases. For example, if a user sends an e-mail message to someone who is out of the office, they must retype the e-mail message again if the e-mail message needs to be redirected to another person for immediate action.

Therefore, it would be advantageous to have an approved computer implemented method, apparatus, and computer usable program code for managing e-mail messages.

SUMMARY OF THE INVENTION

The illustrative embodiments provide a computer implemented method, apparatus, and computer usable program code for managing e-mail messages. A local copy of the e-mail message is stored on the data processing system for a selected period of time in response to sending an e-mail message to a recipient from a data processing system. A determination is made as to whether the local copy of the e-mail message is present in response to receiving a notification that the recipient is unable to respond. The local copy of the e-mail message is retrieved if the local copy of the e-mail message is present to form a retrieved e-mail message. The retrieved e-mail message is presented.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
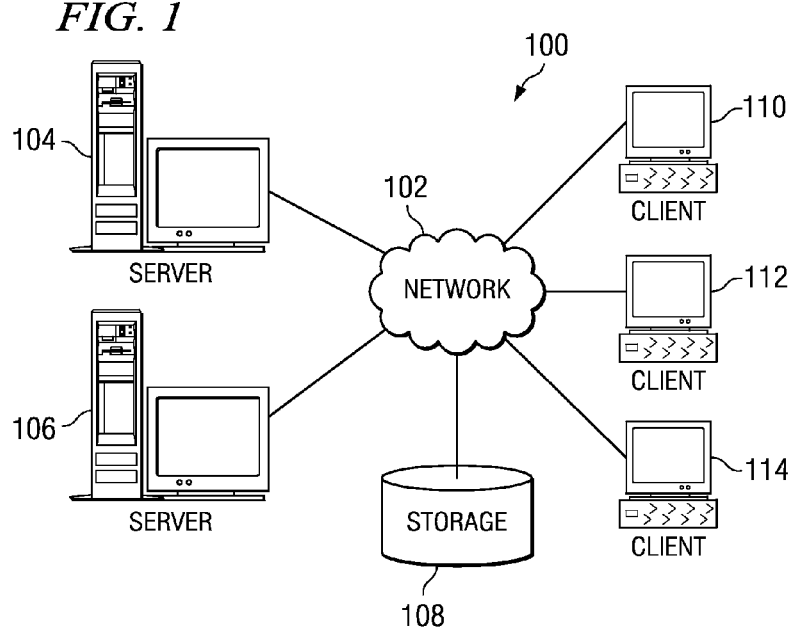
FIG. 1 is a pictorial representation of a network of data processing systems in which illustrative embodiments may be implemented.
Figure 2:
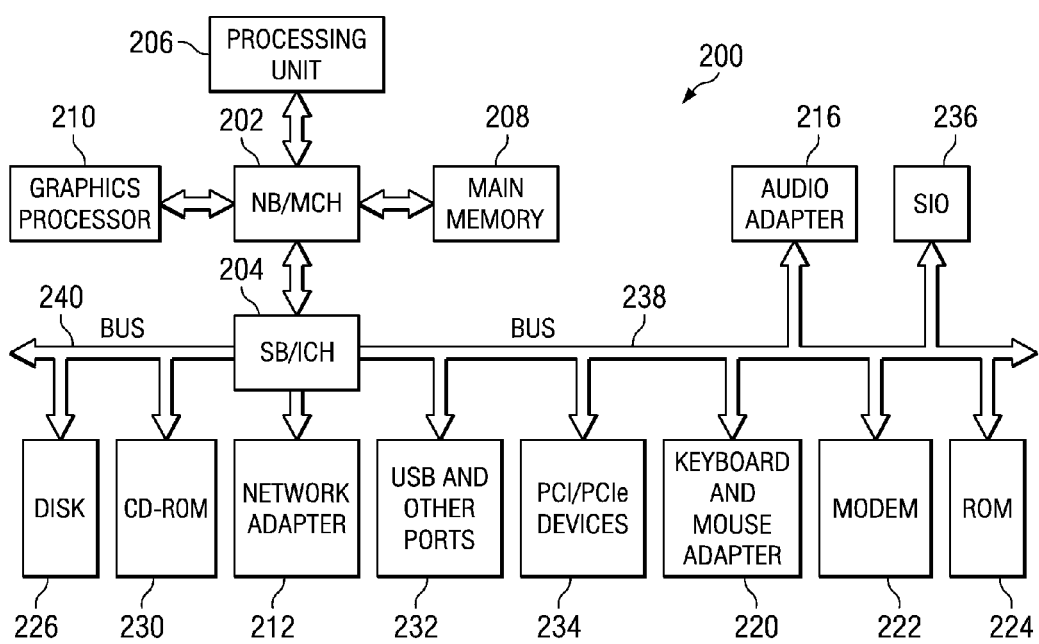
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In particular, server 104 may act as an e-mail server in these examples. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different illustrative embodiments provide a computer implemented method, apparatus, and computer usable program code to automatically retrieve a previously sent e-mail message in the event that the sender receives a notification that the recipient is away. This type of notification provides an indication that the recipient of the e-mail message is unable to or is not checking e-mail messages at all or on any regular basis. Examples of types of a notification are an "out of office" or "on vacation" notification.

In response to sending an e-mail message to a recipient from a data processing system, a local copy of the e-mail message is stored on the data processing system for some selected period of time. If a notification is received that the recipient is away, the local copy of the e-mail message is retrieved to form a retrieved e-mail message. This retrieved e-mail message is presented and may then be redirected to another recipient or otherwise processed.

Figure 3:
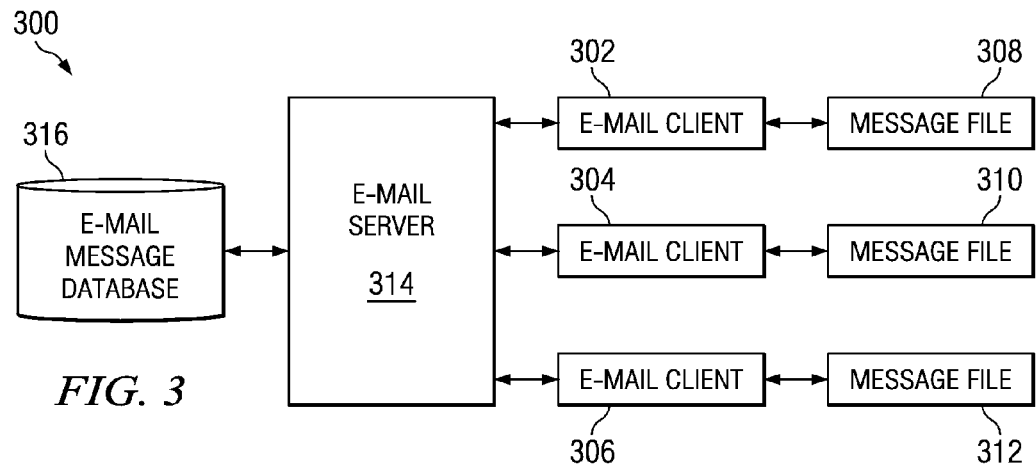
FIG. 3 is a diagram illustrating an e-mail messaging system in accordance with an illustrative embodiment.

Turning now to FIG. 3, a diagram illustrating an e-mail messaging system is depicted in accordance with an illustrative embodiment. In this example, e-mail messaging system 300 includes e-mail client 302, e-mail client 304, and e-mail client 306, which are programs or applications located at different client data processing systems, such as client 110, client 112, and client 114 in FIG. 1. Message file 308, message file 310, and message file 312 are associated with these e-mail clients. These message files store e-mail messages received by the clients and may be organized into various mailboxes. Examples of various mailboxes include, for example, an "in folder", a "sent folder", a "deleted folder", and an "outbox folder".

These e-mail programs may employ different protocols depending upon the implementation. For example, simple mail transfer protocol (SMTP) is a standard e-mail protocol that is based on TCP/IP. This protocol defines an e-mail message format and the message transfer agent, such as sever 314 which stores and forwards the mail. Other protocols, such as post office protocol 3 (POP3) or Internet Message Access Protocol (IMAP) also may be employed.

These e-mail programs are used to send e-mails back and forth to different users through e-mail server 314. Messages sent to other e-mail clients are stored in e-mail message database 316. When an e-mail client connects to e-mail server 314, any messages for that particular client are then sent to the client. E-mail clients 302, 304, and 306 may be implemented using presently available e-mail clients.

The different processes in the illustrative embodiments may be implemented within an e-mail client, such as e-mail clients 302, 304, and 306.

In these illustrative examples, a user of e-mail client 302 may send an e-mail message to a recipient through e-mail server 314. This recipient may be a user of e-mail client 306 in these examples. The user at e-mail client 306 has set an away notification indicating that the user is "out of the office". In other words, this notification indicates that the recipient is unable to respond. As a result, an e-mail message sent by e-mail client 302 results in e-mail server 314 returning a notification that the user at e-mail client 306 is unable to respond.

In these illustrative examples, when the e-mail message is sent by client 302, the sent message is stored in message file 308 on a temporary basis. This sent e-mail message also may be stored in some other local cache on the data processing system on which e-mail client 302 is executing. In response to receiving the notification that the user at e-mail client 306 is unable to respond, e-mail client 302 retrieves the stored sent e-mail message and presents that e-mail message to the user at e-mail client 302. The message may be presented by displaying the message. Alternatively, the message may be placed into the incoming mail folder for the user or some other folder.

In this manner, the user may then redirect the e-mail message to another user for action. If a notification that the user is unable to respond is not received within a selected period of time, the copy of the e-mail message saved in message file 308 is then deleted or purged. In these examples, the notification that the recipient is unable to respond is an "out of office" notification. This process also may be used with other types of notifications that a recipient is unable to respond. For example, if an error occurs at the e-mail server and e-mail server 314 is unable to deliver the sent e-mail message to client 306, an error message is returned to e-mail client 302. The different embodiments also may be applied to this and other types of situations in which a notification is received indicating that the recipient is unable to respond.

Figure 4:
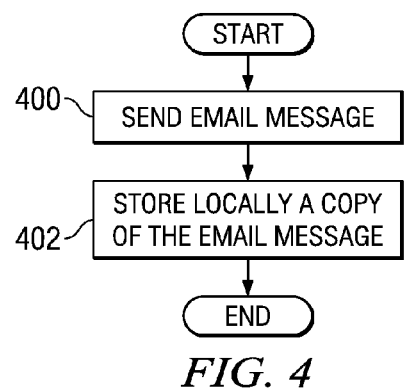
FIG. 4 is a flowchart of a process for saving a sent e-mail message in accordance with an illustrative embodiment.

Turning now to FIG. 4, a flowchart of a process for saving a sent e-mail message is depicted in accordance with an illustrative embodiment. The process illustrated in FIG. 4 may be implemented in an e-mail client, such as e-mail client 302 in FIG. 3.

The process begins by sending an e-mail message (step 400). Thereafter, a copy of the e-mail message is stored locally (step 402). In storing the e-mail message in step 402, a time stamp is present to indicate when the e-mail message was sent in these examples. The process terminates thereafter.

Figure 5:
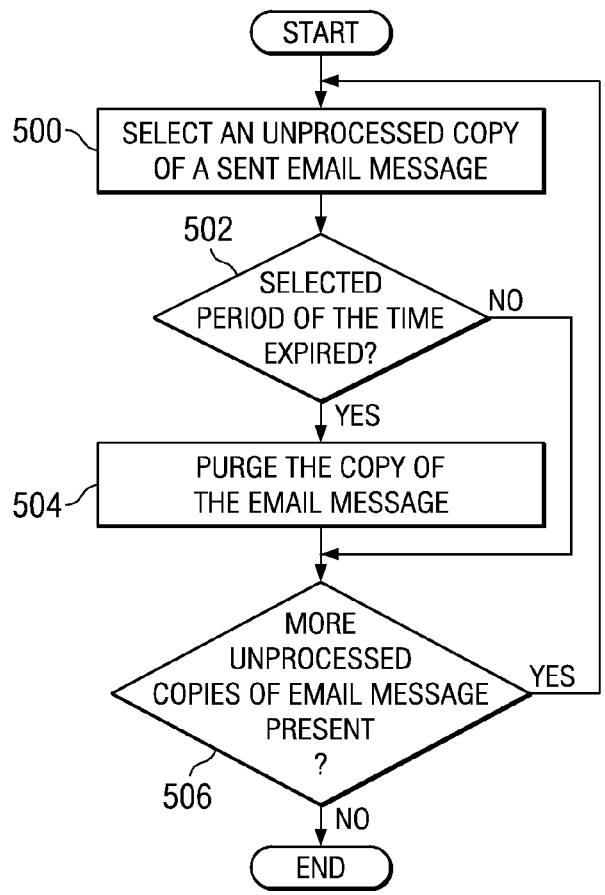
FIG. 5 is a flowchart of a process for managing stored e-mail messages in accordance with an illustrative embodiment.

Turning now to FIG. 5, a flowchart of a process for managing stored e-mail messages is depicted in accordance with an illustrative embodiment. The process illustrated in FIG. 5 may be implemented in an e-mail client, such as e-mail client 302 in FIG. 3.

The process begins by selecting an un-processed copy of a sent e-mail message (step 500). Thereafter, a determination is made as to whether a selected period of time has expired for the selected copy of the e-mail message (step 502). In this example, the time stamp associated with the copy of the e-mail message is compared with a selected period of time to determine whether the e-mail message is older than or within the selected period of time. In these examples, the period of time may be any time and may be user selected. Typically, the selected period of time is some period of time during which a notification would be expected to be received if a user is unable to respond. This selected period of time may be, for example, four hours.

If the selected period of time has expired for the copy of the e-mail message, the e-mail message is then purged (step 504). In this step, the e-mail message is removed from the local storage to increase the amount of storage space available. Thereafter, a determination is made as to whether additional unprocessed copies of the e-mail messages are present (step 506). If additional copies are not present, the process terminates. Otherwise, the process returns to step 500 to select another unprocessed copy of a sent e-mail message.

With reference again to step 502, if the selected period of time has not expired, the process proceeds to step 506 as described above.

Figure 6:
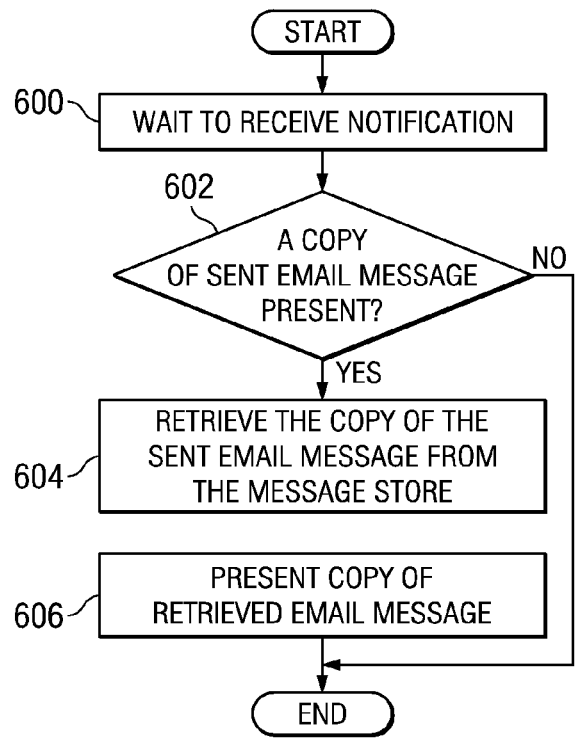
FIG. 6 is a flowchart of a process for managing notifications in accordance with an illustrative embodiment.

Turning now to FIG. 6, a flowchart of a process for managing notifications is depicted in accordance with an illustrative embodiment. The process illustrated in FIG. 6 may be implemented in an e-mail client, such as e-mail client 302 in FIG. 3.

The process begins by waiting to receive a notification (step 600). In these examples, the notification is one for a user that is unable to respond. The user may be unable to respond because the user has indicated that they are out of the office. Alternatively, the user may be unable to respond because of an error in sending an e-mail message to the user.

A determination is made as to whether a copy of the sent e-mail message is present (step 602). The notification is compared to the saved e-mail messages to see if the notification corresponds to one of these e-mail messages. In these examples, the notification may be matched up to the sent e-mail message in step 602 by comparing attributes of the saved e-mail messages to determine if a match occurs. For example, the "TO: address", the "CC: address", the "Subject field", and the "message identifier" are examples of e-mail message attributes that may be used. In the depicted examples, the message identifier is used because it is a unique identifier that is created when an e-mail message is created. This number is placed into the "reply to" field in replies to the e-mail messages, including notifications. This determination is made to determine whether the e-mail message has been purged from the message store.

If a copy of the sent e-mail message is present, the copy of the sent e-mail message is retrieved from the message store (step 604). Thereafter, the copy of the retrieved e-mail message is presented (step 606) with the process terminating thereafter. As described above, the e-mail message may be presented in a number of different ways, such as displaying the e-mail message, or placing the e-mail message in an incoming mail folder.

With reference again to step 602, if a copy of the sent e-mail message is not present, the process terminates. This condition means that the e-mail message has been purged after the selected period of time using the process described in FIG. 5.

Thus, the illustrative embodiments provide a computer implemented method, apparatus, and computer usable program code for managing e-mail messages. In the illustrative embodiments, a local copy of the e-mail message is stored on the data processing system in which the e-mail message was sent in response to sending the e-mail message. This local copy of the e-mail message is stored for a selected period of time. In response to receiving a notification that the recipient is unable to respond, the local copy of the e-mail message is retrieved. If still present, the local copy of the e-mail message is retrieved to form a retrieved e-mail message. The retrieved e-mail message is then presented.

In this manner, the user is able to redirect the e-mail message to another recipient if needed for immediate action. Also, these different illustrative embodiments provide an ability to conserve storage space because the sent e-mail messages are only temporarily sent and purged after some period of time if a notification that the recipient is unable to respond is not received.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing e-mail messages, the computer implemented method comprising:
    responsive to sending an e-mail message from a sending data processing system to a receiving data processing system, storing a local copy of the e-mail message on the sending data processing system for a selected period of time, wherein the selected period of time is a four hour period of time required for a notification to be received when the receiving data processing system is unable to respond to the e-mail message;
    responsive to receiving the notification from the receiving data processing system that the receiving data processing system is unable to respond to the e-mail message, determining, by the sending data processing system, whether the local copy of the e-mail message is currently stored on the sending data processing system, wherein the local copy of the e-mail message is currently stored on the sending data processing system when a first set of attributes contained in the notification matches a second set of attributes contained in the e-mail message;
    responsive to determining that the local copy of the e-mail message is currently stored on the sending data processing system, retrieving, by the sending data processing system, the local copy of the e-mail message to form a retrieved e-mail message; and
    displaying the retrieved e-mail message on a display device;
    automatically purging the local copy of the e-mail message from the sending data processing system after the four hour period of time expires without receiving the notification from the receiving data processing system that the receiving data processing system is unable to respond to the e-mail message.

2. The computer implemented method of claim 1, wherein the local copy of the e-mail message is stored in a local cache in the sending data processing system.

3. The computer implemented method of claim 1, wherein the displaying step further comprises:
    automatically placing the retrieved e-mail message in an incoming mail folder.

4. The computer implemented method of claim 1, wherein the first and second set of attributes comprises a content of an addressee field, a content of a subject field, and a unique identifier created with the e-mail message.

5. The computer implemented method of claim 1, wherein the notification is an error notification indicating an e-mail server is unable to deliver the e-mail message to a recipient.

6. The computer implemented method of claim 1, wherein the notification is an out of office notification.

7. A non-transitory computer program product stored on a recordable-type computer usable medium configured for managing e-mail messages, the computer program product comprising:
    computer usable program code, responsive to sending an e-mail message from a sending data processing system to a receiving data processing system, for storing a local copy of the e-mail message on the sending data processing system for a selected period of time, wherein the selected period of time is a four hour period of time required for a notification to be received when the receiving data processing system is unable to respond to the e-mail message;
    computer usable program code, responsive to receiving the notification from the receiving data processing system that the receiving data processing system is unable to respond to the e-mail message, for determining, by the sending data processing system, whether the local copy of the e-mail message is currently stored on the sending data processing system, wherein the local copy of the e-mail message is currently stored on the sending data processing system when a first set of attributes contained in the notification matches a second set of attributes contained in the e-mail message;

computer usable program code, responsive to determining that the local copy of the e-mail message is currently stored on the sending data processing system, for retrieving, by the sending data processing system, the local copy of the e-mail message to form a retrieved e-mail message; and computer usable program code for displaying the retrieved e-mail message on a display device;

computer usable program code for automatically purging the local copy of the e-mail message from the sending data processing system after the four hour period of time expires without receiving the notification from the receiving data processing system that the receiving data processing system is unable to respond to the e-mail message.

8. The computer program product of claim 7, wherein the local copy of the e-mail message is stored in a local cache in the sending data processing system.

9. The computer program product of claim 7, wherein the computer usable program code for displaying the retrieved e-mail message further comprises:

computer usable program code for automatically placing the retrieved e-mail message in an incoming mail folder.

10. The computer program product of claim 7, wherein the first and second set of attributes comprises a content of an addressee field, a content of a subject field, and a unique identifier created with the e-mail message.

11. A data processing system comprising:

a bus;

a communications unit connected to the bus;

a storage device connected to the bus, wherein the storage device includes computer usable program code; and a processor unit connected to the bus, wherein the processor unit executes the computer usable program code to store a local copy of the e-mail message on a sending data processing system for a selected period of time in response to sending an e-mail message to a receiving data processing system from the sending data processing system, wherein the selected period of time is a four hour period of time required for a notification to be received when the receiving data processing system is unable to respond to the e-mail message; determine, by the sending data processing system, whether the local copy of the e-mail message is currently stored on the sending data processing system, wherein the local copy of the e-mail message is currently stored on the sending data processing system when a first set of attributes contained in the notification matches a second set of attributes contained in the e-mail message, in response to receiving the notification that the recipient computer is unable to respond to the e-mail message; retrieve, by the sending data processing system, the local copy of the e-mail message to form a retrieved e-mail message in response to determining the local copy of the e-mail message is currently stored on the sending data processing system; and display the retrieved e-mail message on a display device; automatically purging, by the sending data processing system, the local copy of the e-mail message from the sending data processing system after the four hour period of time expires without receiving the notification from the receiving data processing system that the receiving data processing system is unable to respond to the e-mail message.

12. The data processing system of claim 11, wherein the local copy of the e-mail message is stored in a local cache in the sending data processing system.

13. The data processing system of claim 11, wherein in executing the computer usable program code to display the retrieved e-mail message, the processor further executes the computer usable program code to automatically place the retrieved e-mail message in an incoming mail folder.

14. The data processing system of claim 11, wherein the first and second set of attributes comprises a content of an addressee field, a content of a subject field, and a unique identifier created with the e-mail message.

* * * * *